(12) United States Patent
Powers et al.

(10) Patent No.: US 12,359,727 B2
(45) Date of Patent: Jul. 15, 2025

(54) ACTIVE FLUSH REGULATION SYSTEM FOR USE WITH A MECHANICAL SEAL OR A PACKING ASSEMBLY

(71) Applicant: A.W. CHESTERTON COMPANY, Groveland, MA (US)

(72) Inventors: Robert James Powers, Salem, MA (US); Henri Azibert, Windham, NH (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 18/794,969

(22) Filed: Aug. 5, 2024

(65) Prior Publication Data

US 2025/0043866 A1 Feb. 6, 2025

Related U.S. Application Data

(60) Provisional application No. 63/517,803, filed on Aug. 4, 2023.

(51) Int. Cl.
*F16J 15/34* (2006.01)
*F16J 15/38* (2006.01)

(52) U.S. Cl.
CPC ....... *F16J 15/3404* (2013.01); *F16J 15/3464* (2013.01); *F16J 15/3484* (2013.01); *F16J 15/3488* (2013.01); *F16J 15/38* (2013.01)

(58) Field of Classification Search
CPC .. F16J 15/3404; F16J 15/3464; F16J 15/3484; F16J 15/3488; F16J 15/38
See application file for complete search history.

(56) References Cited

U.S. PATENT DOCUMENTS

| | | | |
|---|---|---|---|
| 4,145,059 A * | 3/1979 | Imai | F16J 15/3464 |
| | | | 277/408 |
| 4,191,386 A * | 3/1980 | Hershey | F16J 15/162 |
| | | | 277/358 |

(Continued)

FOREIGN PATENT DOCUMENTS

| | | |
|---|---|---|
| CN | 101031745 A | 9/2007 |
| CN | 100406790 C | 7/2008 |
| JP | 4111698 B2 | 7/2008 |

OTHER PUBLICATIONS

International Search Report and Written Opinion, PCT/US2024/040981, dated Feb. 3, 2025, 11 pages.

*Primary Examiner* — Nicholas L Foster
(74) *Attorney, Agent, or Firm* — Nelson Mullins Riley & Scarborough LLP; Anthony A. Laurentano

(57) ABSTRACT

An active flush regulation system having a rotary component, a stationary component, one or more biasing elements for applying a biasing force to the stationary component in a first direction for biasing together a rotor sealing surface and a stator sealing surface, and a holder component for holding one or more of the stationary component and the rotary component. The rotor sealing surface and the stator sealing surface form an under-balanced seal face, where in a first closed position the rotor sealing surface and the stationary sealing surface contact each other, and when flushing fluid is introduced to the seal face, the flushing fluid acts to place the rotor sealing surface and the stator sealing surface in an open position where the rotor sealing surface and the stator sealing surface are separated from each other to form a gap to allow the flushing fluid to pass therealong.

19 Claims, 11 Drawing Sheets

(56) References Cited

U.S. PATENT DOCUMENTS

| | | | | |
|---|---|---|---|---|
| 5,195,867 | A * | 3/1993 | Stirling | F16J 15/3404 |
| | | | | 415/111 |
| 7,413,615 | B2 * | 8/2008 | Yada | B01J 4/001 |
| | | | | 415/111 |
| 7,878,509 | B2 * | 2/2011 | Takahashi | F16J 15/348 |
| | | | | 277/359 |
| 8,210,541 | B2 * | 7/2012 | Takahashi | F16J 15/3404 |
| | | | | 277/408 |
| 8,231,130 | B2 | 7/2012 | Takahashi | |
| 12,152,677 | B2 * | 11/2024 | Powers | F16J 15/3488 |
| 2004/0212154 | A1 * | 10/2004 | Yada | B01J 4/001 |
| | | | | 277/512 |
| 2009/0200749 | A1 * | 8/2009 | Teshima | F16J 15/3484 |
| | | | | 277/512 |
| 2010/0117303 | A1 * | 5/2010 | Takahashi | F16J 15/3404 |
| | | | | 277/352 |
| 2023/0204107 | A1 * | 6/2023 | Powers | F16J 15/3488 |
| | | | | 277/370 |

* cited by examiner

ACTIVE FLUSH REGULATION SYSTEM FOR USE WITH A MECHANICAL SEAL OR A PACKING ASSEMBLY

RELATED APPLICATIONS

The present application claims priority to U.S. provisional application Ser. No. 63/517,803, filed on Aug. 4, 2023, and entitled Activated Flush Regulator For A Split Mechanical Seal, the contents of which are herein incorporated by reference.

BACKGROUND OF THE INVENTION

Conventional mechanical seal and mechanical packing components are employed in a wide variety of environments and settings, such as for example, in mechanical apparatuses, to provide a fluid-tight seal. The sealing components are usually positioned about a rotating shaft or rod that is mounted in and protrudes from a stationary mechanical housing.

Conventional mechanical seals including split mechanical seals and mechanical packing are employed in a wide variety of sealing systems employed with mechanical apparatuses to provide a pressure-tight and fluid-tight seal. The mechanical seal or mechanical packing are usually positioned about a rotating shaft that is mounted in and protruding from a stationary housing. The mechanical seal assembly is usually bolted to the outside of the housing at the shaft exit, thus preventing the loss of pressurized process fluid from the housing. Typical mechanical seals include face-type mechanical seals, which include a pair of sealing rings that are concentrically disposed about the shaft and are axially spaced from each other. The sealing rings each have sealing faces that are biased into sealing contact with each other by conventional biasing mechanisms, including biasing clips or springs. Usually, one seal ring remains stationary (i.e., the stationary seal ring) while the other ring is secured to the shaft and rotates therewith (i.e., the rotary seal ring). The mechanical seal prevents leakage of the pressurized process fluid to the external environment by biasing the seal ring sealing faces in sealing contact with each other. The rotary seal ring is usually mounted in a holder or sleeve assembly which is concentrically disposed about the equipment shaft. Likewise, the gland assembly may be solid or have a pair of gland halves that also secured together by a screw. The stationary sealing element is typically mounted within the gland assembly.

Mechanical packing can be used in stationary equipment, such as a pump, to prevent leakage around a pump shaft. The mechanical packing includes a packing assembly that consists of rings of flexible, compressible material, such as braided fibers or synthetic materials, that are installed in a stuffing box of the pump around the shaft. When compressed, the packing rings form or create a seal that reduces leakage between the rotating shaft and the pump housing. While packing is designed to allow some controlled leakage for lubrication and cooling, the packing requires regular monitoring and adjustment to maintain proper sealing performance.

A common problem with maintaining mechanical seals and mechanical packing systems is that they are often mounted in locations that are not easily accessible by maintenance personnel. Further, the commercial or industrial installation may employ a number of mechanical seals and mechanical packing systems installed pumps that require significant time on the part of the maintenance personnel to visually inspect.

Flushing of mechanical seals and mechanical packing systems, on large industrial pumps, is used to extend the life of the seal by cleaning and/or cooling the seals. There are many methods for implementing seal flush, but all either recirculate fluid from various other points on the industrial pump (usually the output) or use an external source for the flushing stream.

In either case a step-up in pressure, and/or flow control may be required, and a small micropump pump is often used for that purpose. Micropump gear pumps are well suited for this application because they provide a well-controlled, smooth flow, and are built of materials that provide chemical capability and the temperature range require for most applications.

Conventional sealing systems can also employ a throat bushing, also known as a shaft sleeve or a gland bushing, that can be used with the mechanical seal in rotating equipment such as pumps, mixers, and compressors, to protect the shaft and minimize wear of the mechanical seal and mechanical packing. The throat bushing can function as a barrier between the rotating shaft and the mechanical seal. The throat bushing does not contact the shaft directly. Rather, the bushing creates a narrow clearance area around the shaft thereby restricting the about of flush. This helps to extend the life of the sealing components and reduces the need for costly repairs or replacements. Further, mechanical seals rely on a thin film of lubricating fluid (usually pumped or provided externally) between the rotating and stationary components to create a seal. The throat bushing helps maintain this fluid by reducing friction and heat generated during shaft rotation, preventing the seal from running dry and potentially failing due to overheating or wear. In a similar fashion with mechanical packing, the throat bushing attempts to increase the seal cavity pressure and providing lubrication and cooling.

Still further, conventional throat bushings, when used in combination with a mechanical seal and mechanical packing, provide a self-cleaning and cooling mechanism. The bushing is usually installed between the mechanical seal and the stuffing box or housing of the equipment. The throat bushing can be specially configured to create a pumping action that induces a flow of clean, cool fluid (typically the pumped process fluid) towards the seal faces. This fluid flow helps to wash away and flush out any debris, particles, or crystallized materials that may have accumulated at or near the seal faces. In applications where the process fluid generates heat during operation, the throat bushing can help dissipate some of this heat by promoting fluid flow across the seal faces, thus extending the life of the mechanical seal and prevents premature failure thereof. However, the practical execution of a throat bushing does not provide sufficient restriction to minimize the amount of flush that gets into the process fluid. Due to tolerances and eccentricities of the pump shaft to the seal cavity bore, the throat bushing controlling gap cannot be minimized to the desired levels. The added volume of flush that enters the process places burdens on removing the excess fluid. In the case of water used as flush, energy and the accompanying costs increases the desire to reduce flush volumes.

SUMMARY OF THE INVENTION

The present invention is directed to a fluid regulating system that employs an active flush regulating system for actively controlling and regulating the flow of a flushing fluid into stationary equipment. The active flush regulating system helps control the amount of flushing fluid that is employed to flush contaminants and particulates away from sealing surfaces while minimizing the amount of flushing fluid that eventually mixes with the process fluid in stationary equipment. This significantly reduces the costs to remove the flushing fluid from the process fluid during the operational life of the stationary equipment.

The present invention is directed to a fluid regulating system comprising a stationary equipment configured for housing a process fluid and a rotating shaft, a mechanical seal coupled to the stationary equipment and disposed about the rotating shaft, and an active flush regulation system for regulating a flow of a flushing fluid introduced thereto. The active flush regulating system includes a rotary component coupled to the rotating shaft and rotating therewith, the rotary component having a rotor sealing surface, a stationary component coupled to the stationary equipment and having a stator sealing surface that confronts and is disposed adjacent to the rotor sealing surface, one or more biasing elements for applying a biasing force to the stationary component in a first direction for biasing together the rotor sealing surface and the stator sealing surface, and a holder component coupled to one of the rotary component and the stationary component for holding one or more of the stationary component and the rotary component.

The rotor sealing surface and the stator sealing surface are configured to form an under-balanced seal face, and wherein in a first closed position the rotor sealing surface and the stationary sealing surface contact to each other to form the seal face. When the flushing fluid is introduced to the seal face, the flushing fluid acts upon a piston area formed on one or more of the stator sealing surface and the rotor sealing surface. The flushing fluid applies a force to the piston area in a second direction opposite the first direction of the biasing force. When the force applied by the flushing fluid is greater than the biasing force and a force applied by the process fluid, the flushing fluid places the rotor sealing surface and the stator sealing surface in an open position where the rotor sealing surface and the stator sealing surface are separated from each other to form a gap to allow the flushing fluid to pass therealong. The gap formed between the rotor sealing surface and the stator sealing surface regulates the flow of flushing fluid passing through the seal face. The system can include an optional second holder component, where the second holder component is a sleeve component that is disposed about and rotatably coupled to the shaft. The piston area can be formed on the stator sealing surface to form the under-balanced seal face.

The mechanical seal can include a rotary seal ring, a stationary seal ring, and a lock ring. The rotary seal ring can be coupled to the shaft to rotate therewith, and the rotary seal ring and the stationary seal ring form a sealing interface. Alternatively, the mechanical seal comprises a sealing assembly, where the sealing assembly includes a packing assembly having a plurality of packing elements, where each of the packing elements is formed from a packing material.

According to one embodiment, the rotary component has an inner axially extending surface having an optional groove formed therein for seating a sealing element. Further, the holder component can have an optional groove formed along an inner axially extending surface for seating a sealing element. The sealing element is positioned to contact an outer axially extending surface of the stationary component.

According to other embodiments, the system includes a second holder element configured as a sleeve component that is coupled to the shaft and is rotatable therewith, where the sleeve component is configured to hold and to position the active flush regulation system. Alternatively, the holder element comprises a sleeve component that is disposed about the shaft and rotatably coupled thereto and configured to hold and to position the active flush regulation system. The sleeve component can include an optional flange portion that is sized and configured for holding the rotary component.

The present invention is also directed to an active flush regulation system for use with a mechanical seal that is coupled to stationary equipment for regulating a flow of a flushing fluid. The active flush regulation system can include a rotary component coupled to the rotating shaft and rotating therewith, the rotary component having a rotor sealing surface, a stationary component coupled to the stationary equipment and having a stator sealing surface that confronts and is disposed adjacent to the rotor sealing surface, one or more biasing elements for applying a biasing force to the stationary component in a first direction for biasing together the rotor sealing surface and the stator sealing surface, and a holder component coupled to one of the rotary component and the stationary component for holding one or more of the stationary component and the rotary component.

The rotor sealing surface and the stator sealing surface can be configured to form an under-balanced seal face, and wherein in a first closed position the rotor sealing surface and the stationary sealing surface contact to each other to form the seal face. When the flushing fluid is introduced to the seal face, the flushing fluid acts upon a piston area formed on one or more of the stator sealing surface and the rotor sealing surface. The flushing fluid applies a force to the piston area in a second direction opposite the first direction of the biasing force. When the force applied by the flushing fluid is greater than the biasing force and a force applied by the process fluid, the flushing fluid places the rotor sealing surface and the stator sealing surface in an open position where the rotor sealing surface and the stator sealing surface are separated from each other to form a gap to allow the flushing fluid to pass therealong. The gap formed between the rotor sealing surface and the stator sealing surface regulates the flow of flushing fluid passing through the seal face.

The active flush regulation system can also optionally include a sleeve component that is disposed about and rotatably coupled to the shaft.

According to one embodiment, the rotary component has an inner axially extending surface has an optional groove formed therein for seating a sealing element. Also, the holder component can have an optional groove formed along an inner axially extending surface for seating a sealing element, where the sealing element is positioned to contact an outer axially extending surface of the stationary component.

The active flush regulation system can include an optional second holder element configured as a sleeve component that is coupled to the shaft and is rotatable therewith, wherein the sleeve component is configured to hold and to position the active flush regulation system. The sleeve component can include an optional flange portion that is sized and configured for holding the rotary component.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE INVENTION

Figure 1:
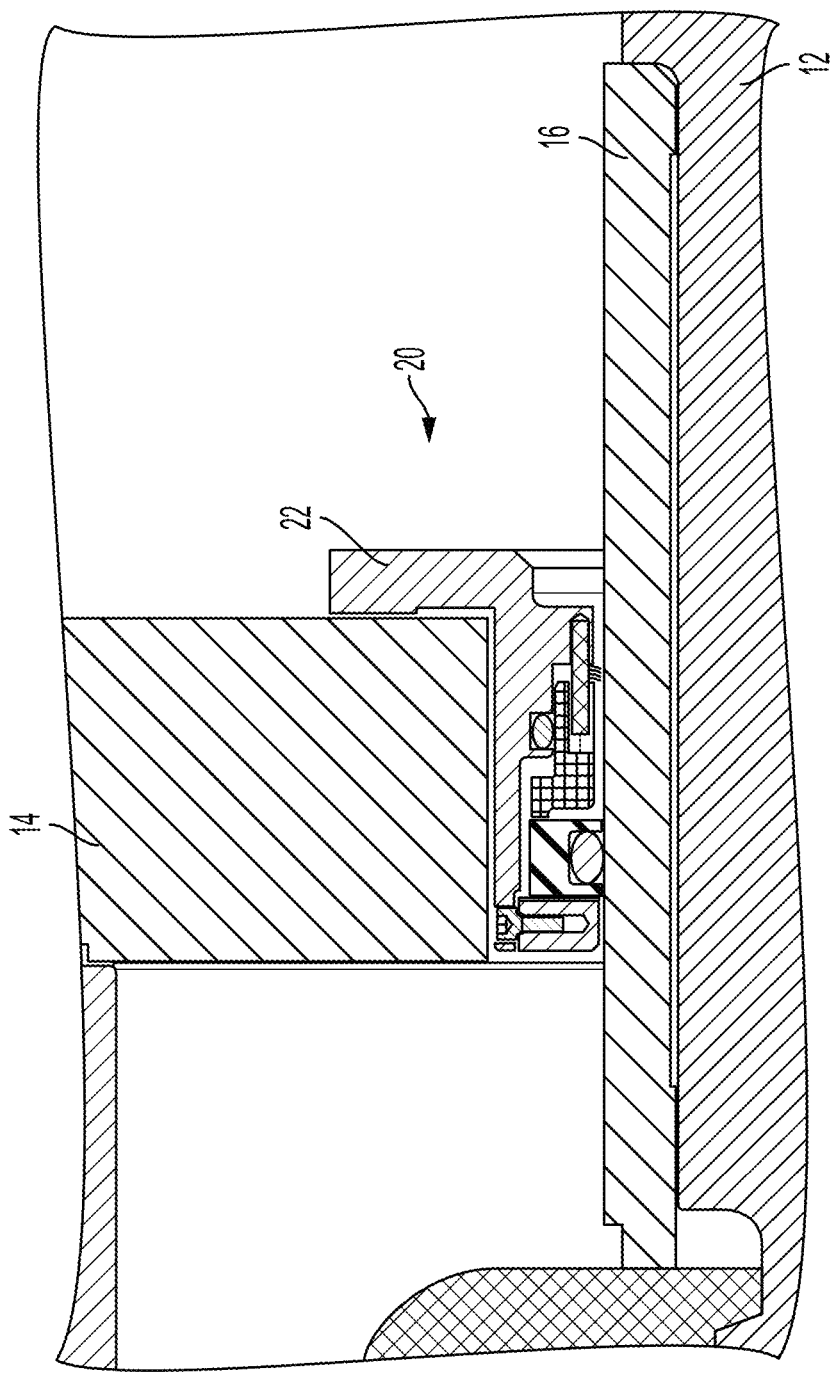
FIG. 1 is a partial cross-sectional view of a first embodiment of a fluid regulating system employing an active flush regulation system according to the teachings of the present invention.
Figure 2:
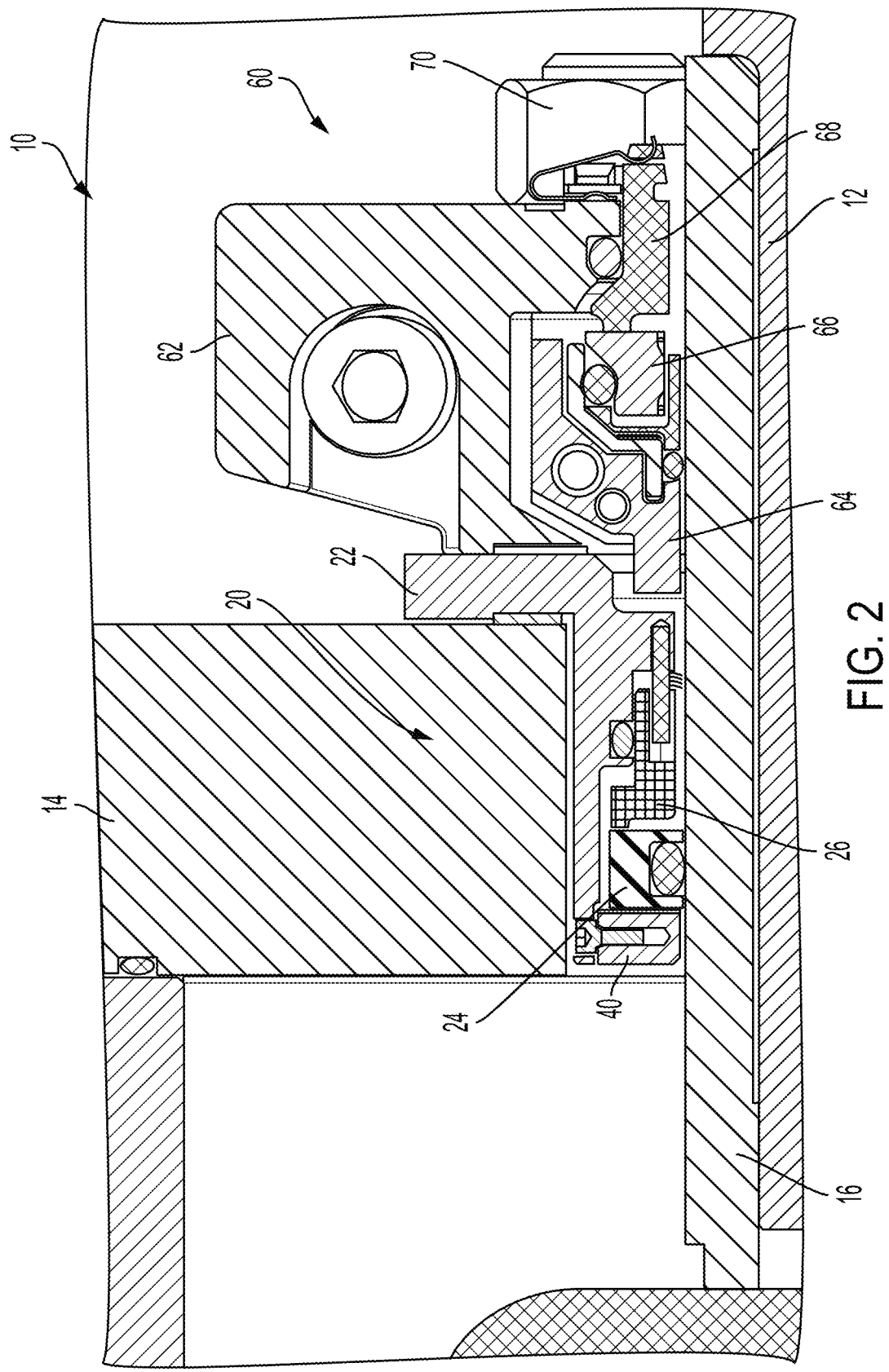
FIG. 2 is a partial cross-sectional view of the fluid regulating system of FIG. 1 showing the active flush regulation system used with a mechanical seal according to the teachings of the present invention.

The term "shaft" is intended to refer to any suitable device in a mechanical system to which a seal can be mounted and includes shafts, rods and other known devices. The shaft is moveable in selected directions and can be a reciprocating or a rotating shaft.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical sealing assembly that are disposed proximate to the mechanical system employing the seal assembly. As such, the components of the sealing assembly are mounted within the equipment or are disposed the deepest within or closest to the equipment (e.g., inboard). Conversely, the term "axially outer" as used herein refers to the portion of stationary equipment and a seal assembly distal from the mechanical system (e.g., outboard).

The term "radially inner" as used herein refers to the portion of the sealing assembly or associated components that are proximate to a shaft. Conversely, the term "radially outer" as used herein refers to the portion of the seal assembly or associated components that are distal from the shaft.

The terms "stationary equipment" and/or "static surface" as used herein are intended to include any suitable stationary structure that is configured to house a movable shaft or rod to which a seal having a gland assembly is secured. The shaft can rotate or reciprocate. Those of ordinary skill in the art will readily recognize that the gland assembly can form part of the mechanical seal or part of the stationary equipment.

The terms "process medium" and/or "process fluid" as used herein generally refers to a medium or fluid being transferred through the stationary equipment or housed therein. In pump applications, for example, the process medium is the fluid being pumped through the pump housing.

The term "gland" or "gland element" as used herein is intended to include any suitable structure that enables, facilitates, or assists securing the mechanical seal and the sealing assembly to the stationary equipment, while concomitantly surrounding or housing, at least partially, one or more seal components. If desired, the gland can also provide fluid access to the mechanical seal.

The term "mechanical seal" as used herein is intended to include various types of sealing assemblies and mechanical seals, including cap seals, single seals, tandem seals, dual seals, concentric seals, gas seals, spiral seals, solid seals, split seals and other known seal types and configurations.

The term "sealing assembly" is intended to refer to a combination of components employed in a mechanical seal that can be mounted in or coupled to stationary equipment, and the components can be sized and configured to form a secure and effective seal with a movable shaft associated with the stationary equipment. The sealing assembly can include multiple sealing components forming a sealing element assembly that is mounted or coupled to a gland element. The sealing components depend upon the type of sealing assembly employed. For example, in a cap seal, the sealing components can include an energizer element and a sealing or cap element. The sealing assembly can also include a packing assembly having a series of individual packing elements. The packing elements can be optionally braided packing elements formed from suitable packing material.

The term "packing material" as used herein is intended to include resilient and at least partially compressible materials for sealing a variety of fluids in a gland or stationary equipment under a wide array of pressures and temperatures.

The term "seal face" as used herein is intended to refer to one or more surfaces, such as the sealing surfaces, of a stationary component and a rotary component that when in contact with each other form a fluid seal.

The term "piston area" is intended to mean or refer to a surface area of a seal face of a rotary component or a stationary component, or both, that is exposed to a fluid pressure or pressure applied by a fluid, such as a flushing fluid. The piston area helps determine the force exerted on the seal face, which affects the performance and reliability of the seal face. The piston area influences the balance of forces acting on the seal faces. The configuration of the sealing surfaces of the rotary component and the stationary component forms the piston area so as to help ensure that the seal operates effectively under varying operating pressures and conditions.

The term "unbalanced" with regard to a seal or seal face is intended to refer to or mean that a closing or opening force applied to a rotary or stationary component, or both, exceeds an opening or closing force, respectively, applied thereto resulting in contact pressure or a lack of contact pressure between the sealing surfaces of the rotary and stationary components forming the seal face. According to one embodiment, the unbalanced seal face refers to an under-balanced seal face condition where the condition occurs when a pressure acting on an inner diameter of the sealing surface or seal face of the rotary or stationary component, or both, is greater than a pressure applied to an outer diameter of the sealing surfaces and other surfaces of the components. The design or configuration of the sealing surface or seal face of one or more of the rotary and stationary components determines whether the seal face or sealing surfaces are under-balanced.

The terms "inboard" and "outboard" as used herein in relation to a mechanical seal and/or stationary equipment refers to␣a axial position of components forming part of the mechanical seal or fluid regulating system relative to the equipment being sealed. The inboard position of the components typically refers to a position within the stationary equipment on the side of the seal closest to the fluid being sealed. The inboard components can be designed to prevent the process fluid from leaking out of the stationary equipment and into the environment or other parts of the equipment or system. In contrast, an outboard seal is positioned outside the stationary equipment on the side of the seal farthest from the process fluid and axially spaced from the inboard seal. The outboard seal is typically used in tandem with the inboard seal in double seal configurations to provide additional containment and protection.

The present invention is directed to a fluid regulating system that employs an active flush regulation system or subsystem that can be used in connection with a mechanical seal and sealing assembly and is mounted in stationary equipment. The active flush regulation system can be a split system or a solid system. The teachings below in connection with the active flush regulation systems are pertinent to both split and solid types of systems. The active flush regulation system can employ a pressure dependent gap formed between selected mechanical components as opposed to a fixed mechanical gap as used in conventional fluid regulating systems. As such, the active flush regulation system is a pressure condition reacting system as opposed to a fixed clearance system. The active flush regulation system can employ lapped or overlapping floating sealing surfaces that are similar to seal rings in a mechanical seal for controlling a flow of a flushing fluid instead of relying on machined fixed surfaces of conventional seal rings or fluid restriction devices, such as a throat bushing. The active flush regulation system thus provides for control or regulation of the flow rate of the flushing fluid across the seal face instead of having to rely on clearances (e.g., a clearance gap) formed by mechanical components and supply pressure.

The active flush regulation system of the present invention can be, in essence, an accessory for stationary equipment, such as a pump or valve, that can function to create an axially inboard fluid containment chamber for the environmental that can be employed in conjunction with a separate mechanical seal or sealing assembly such as a mechanical packing assembly. The active flush regulation system reduces the flow rates of flushing fluid required in standard flush and piping systems. The flow rate reduction aspect of the active flush regulation system can be achieved using a hydraulically "under" balanced seal face design which, once exposed to an external flush pressure at a selected level, can open or separate the mechanical components of the active flush regulation system and allow the flushing fluid to flow therethrough at a selected flow rate. Further, the opening hydraulic area of the mechanical components of the active flush regulation system is greater than the hydraulic closing area, such that above a certain pressure differential, the mechanical components counter-act a combined spring and process fluid pressure closing pressure and opens the seal faces of the mechanical components and releases the flushing fluid. This forms an under-balanced sealing assembly, where the pressure of the flushing fluid can overcome the closing force applied by the process pressure and associated biasing elements. The flush containment aspect of the active flush regulation system of the present invention can be achieved with a stand-alone device or alternatively can be integrated into a single mechanical seal.

One embodiment of the fluid regulating system of the present invention employing an active flush regulation system is shown for example in FIG. 1. The illustrated fluid regulating system 10 includes an active flush regulation system 20 that can be mounted on or in connection with stationary equipment 14. The stationary equipment 14 can include an equipment housing that corresponds, for example, to a pump. The stationary equipment 14 houses a movable (e.g., rotating) shaft 12 that extends or protrudes outwardly therefrom. The stationary equipment 14 can have a suitable chamber or stuffing box formed therein that is adjacent the shaft 12 that mounts an active flush regulation system 20. The illustrated fluid regulating system 10 can also employ a mechanical seal 60 that helps seal a process fluid within the stationary equipment 14. The mechanical seal 60 can be any selected type of seal or sealing assembly, such as a solid or a split mechanical seal. The illustrated mechanical seal 60 can include known components, such as a gland assembly 62 that mounts a holder assembly 64. The holder assembly 64 can be sized and configured to mount a rotary seal ring 66 that is disposed adjacent to and in sealing contact with a stationary seal ring 68. The rotary and stationary seal rings form the primary sealing components of the mechanical seal 60. The mechanical seal 60 can also include a lock ring assembly 70 that serves to axially position and lock the seal rings in place relative to each other during use.

Figure 3:
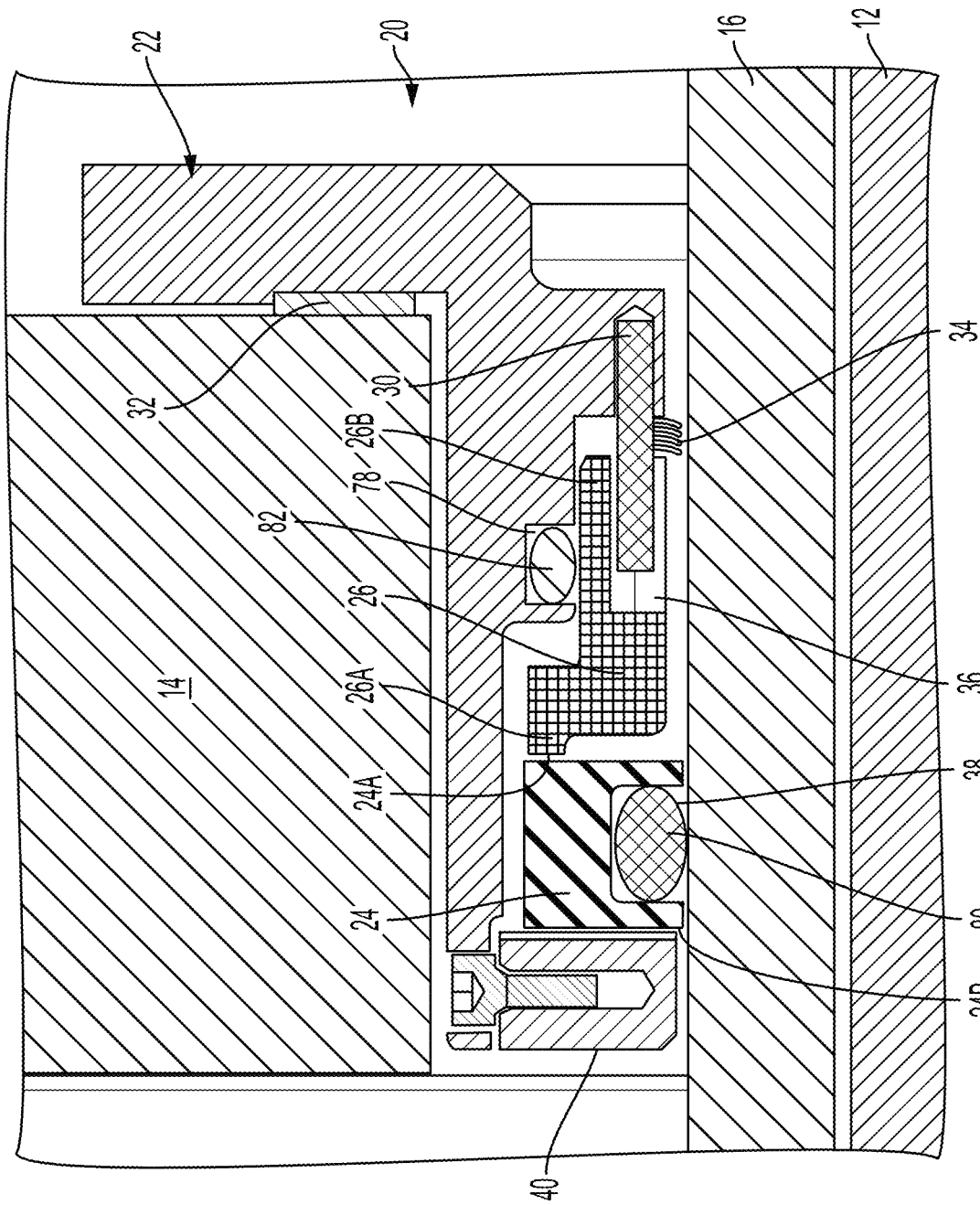
FIG. 3 is a further partial cross-sectional view of the active flush regulation system of FIG. 1 according to the teachings of the present invention.
Figure 4:
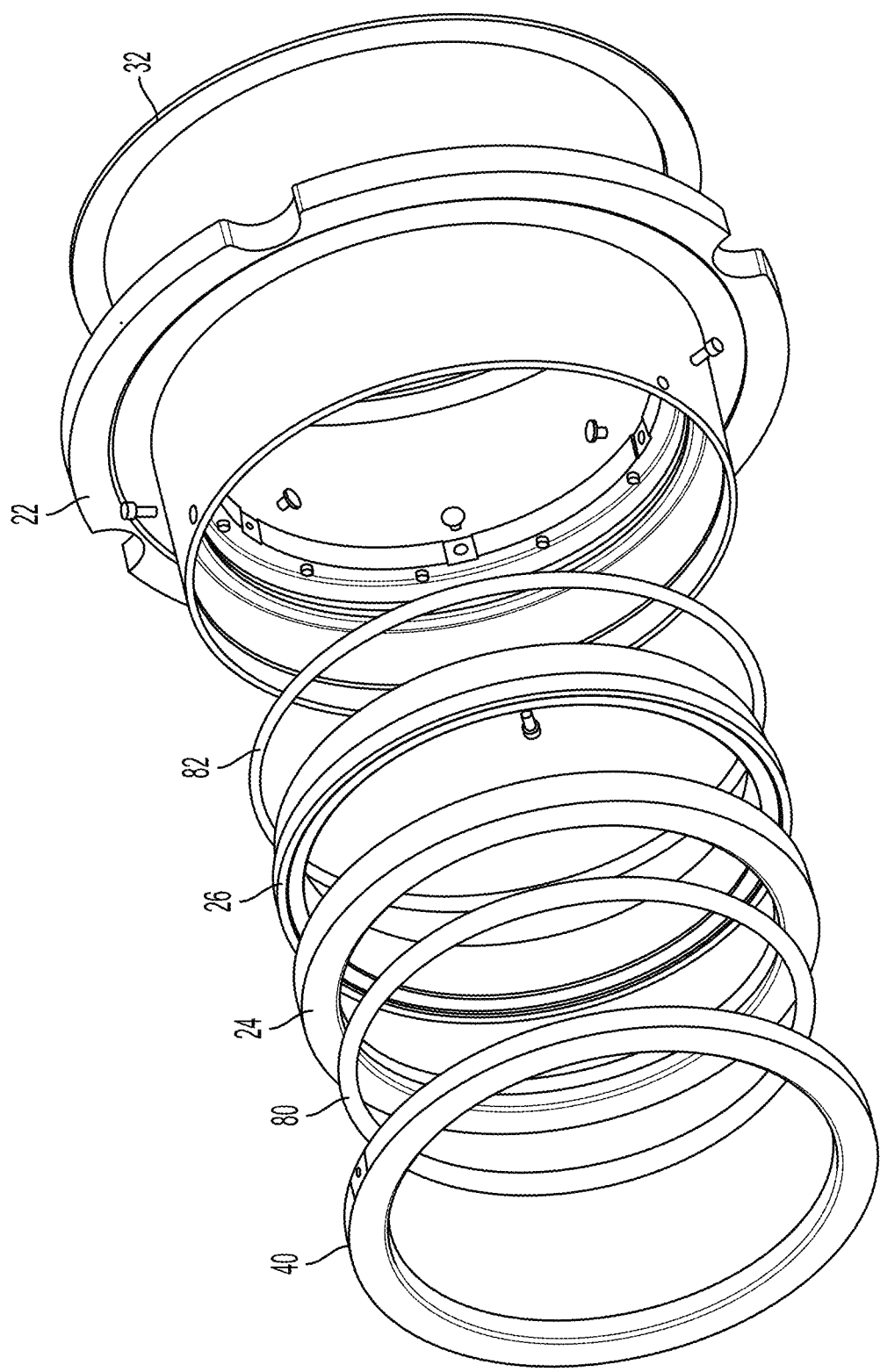
FIG. 4 is an exploded unassembled perspective view of the active flush regulation system of FIG. 1 according to the teachings of the present invention.

The components of the active flush regulation system 20 are shown for example in FIGS. 1 and 3-4. The active flush regulation system 20 can include one or more holder elements that are disposed about the shaft 12. The holder elements can be coupled to the stationary equipment 14 or to the shaft 12. The holder elements serve to hold or retain selected components or to position the components in the fluid regulating system. The active flush regulation system 20 includes a holder component 22 can be coupled to the stationary equipment 14 so as to remain stationary. The holder component 22 serves to radially position and house a rotary component 24 and a stationary component 26. The stationary component 26 is coupled to the holder component 22 via a connection element 30, such as a pin. A sealing element, such as a gasket 32, forms a fluid seal between the holder component 22 and a top or external surface of the stationary equipment 14. The active flush regulation system 20 includes a biasing element 34, such as a spring, that is mounted between an inner radial surface of the holder component 22 and a top surface 26B of the stationary component 26. The holder component 22 also has a groove 78 formed along an inner surface that mounts a sealing element 82, such as an O-ring. The sealing element 82 forms a fluid seal between the holder component 22 and the outer surface of the stationary component 26. The fluid regulation system 10 can also include an optional second holder component, such as a sleeve component 16, that is disposed about the shaft 12 and can be configured to rotate therewith. The sleeve component 16 can form part of the active flush regulation system 20 or can be a separate component. The sleeve component 16 can be configured to protect the shaft 12 from wear and corrosion. The sleeve component 16 also helps maintain the integrity of the fluid seal of the fluid regulating system 10 by providing a consistent, smooth surface for the seal components of the mechanical seal and the active flush regulation system 20 to interface with. This ensures a proper seal, reducing the risk of leaks and improving the overall efficiency of the system. The sleeve component 16 also helps maintain the alignment of the rotating shaft 12 and the sealing components. This helps ensure that the seal operates correctly and extends the life of the seal by reducing misalignment-induced wear.

The illustrated stationary component 26 has a stator sealing surface 26A and an opposed top surface 26B. The sealing surface 26A can be a single relatively flat, planar surface or can include multiple stepped surfaces. According to one embodiment, the sealing surface 26A includes multiple stepped surfaces. The top surface 26B of the stationary component can have an opening 36 formed therein for seating a portion of the connection element 30 so as to connect the stationary component 26 to the holder component 22. The rotary component 24 is positioned axially inwardly (e.g., inboard) of the stationary component 26 and has a rotor sealing surface 24A facing the stator sealing surface 26A of the stationary component 26 and an opposed bottom surface 24B. The rotor sealing surface 24A can be a single relatively flat, planar surface or can include multiple stepped surfaces. According to one embodiment, the sealing surface 24A includes a single planar surface. The planar portion of the sealing surface 26A of the stationary component 26 that contacts the planar sealing surface 24A of the rotary component 24 to form the fluid seal is smaller than the planar sealing surface of the rotary component 24. The scaling surface 26A of the stationary component 26 is thus undersized relative to the sealing surface of the rotary element to form an under-balanced seal face. In one embodiment, the inner surface of the rotary component 24 has an opening 38 formed therein for seating a sealing element 80, such as an O-ring. The sealing element 80 forms a fluid seal between the rotary component 24 and the sleeve component 16.

The active flush regulation system 20 can also include a positioning element 40, such as a thrust bearing, that is disposed axially inwardly of the rotary component 24 and is positioned between the shaft 12 and the stationary equipment 14. The thrust bearing 40 is configured to support axial loads created by fluid pressure and ensures the proper positioning, alignment, and functioning of the rotary and stationary components. The thrust bearing helps manage axial loads that occur parallel to the shaft 12 and helps prevent excessive axial movement, which can lead to misalignment or damage to the sealing surfaces of the sealing components. Proper alignment of the sealing surfaces helps ensure that the surfaces remain aligned, reducing wear and increasing the lifespan of the rotary and stationary components.

Figure 5:
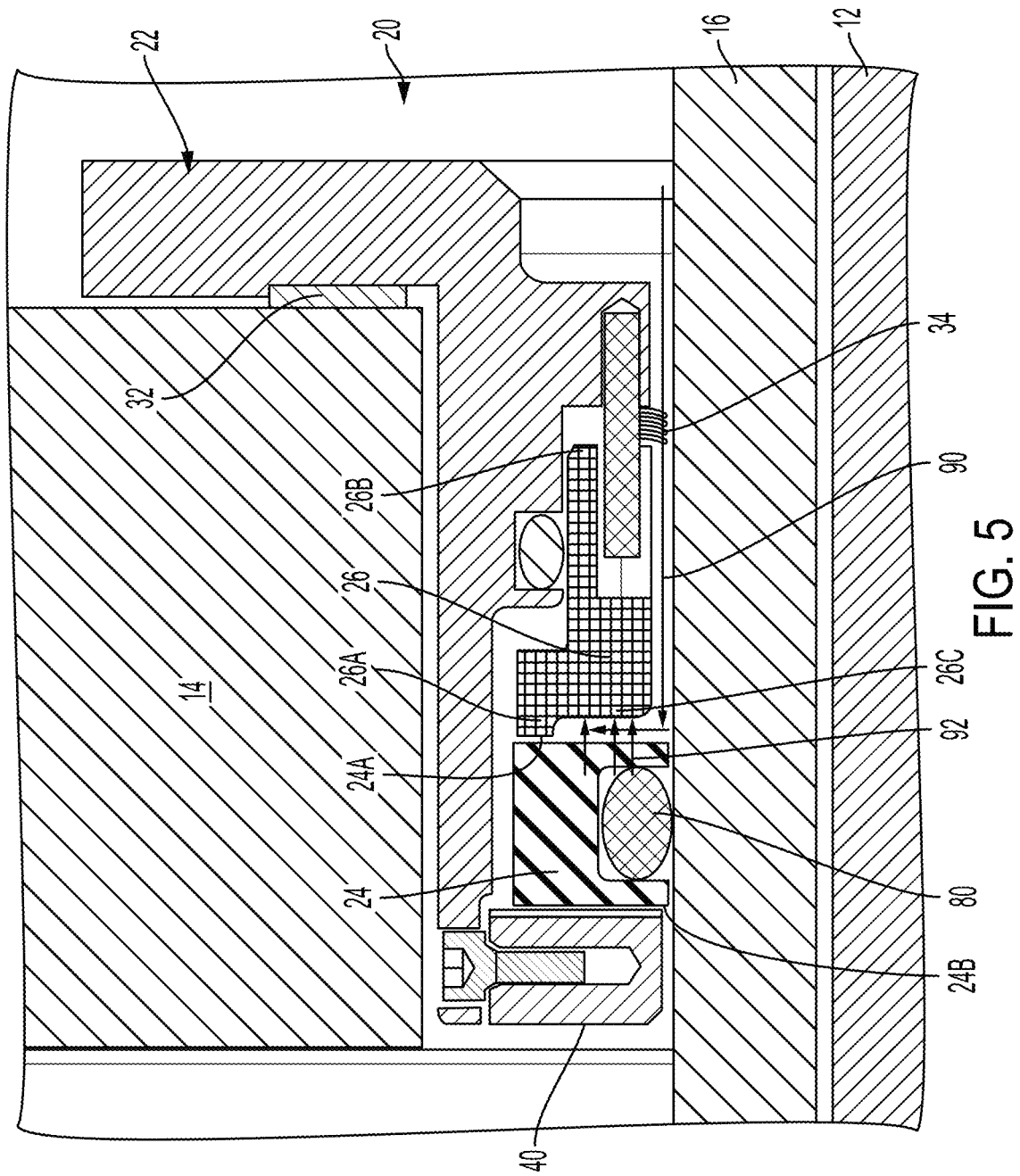
FIG. 5 is a partial cross-sectional view of the active flush regulation system of FIG. 1 showing the flow of the flushing fluid and pressure forces applied to a piston area of a stationary component according to the teachings of the present invention.

In operation, as shown in FIG. 5, the biasing element 34 forces the sealing surfaces 24A, 26A together to form a fluid seal at the seal face. The sealing surfaces contact each other when the pressure of the flushing fluid is insufficient to overcome the biasing force or pressure applied by the springs 34 and the process fluid surrounding the components 24, 26. As such, the forces applied by the biasing elements 34 and the process fluid place the sealing surface in a closed position where the sealing surfaces contact each other. When a flushing fluid is introduced into the system, the flushing fluid flows along the path indicated by the arrows 90 at a selected flow rate. The flow rate of the flushing fluid refers to the volume of fluid that passes through the active flush regulation system 110 per unit of time. The flushing fluid can be used to flush or clean the seal area and ensure proper lubrication and cooling while preventing the buildup of contaminants therein. The primary functions of a flushing fluid include lubrication, cooling, and contaminant removal by flushing away particles, debris, and other contaminants that could damage the seal or affect seal performance. The type of flushing fluid that can be employed in the fluid regulation system 10 depends on the application and the specific requirements of the system and mechanical seal, and can include for example water, oil, process fluid, and specialty fluids such as glycol-water mixtures, synthetic lubricants, chemical inhibitors, and the like. Since the rotary and stationary components are configured to be under-balanced, the flushing fluid flows to the inner diameter of the sealing surfaces 24A, 26A and applies a force thereto. Specifically, the stepped portion of the stator sealing surface 26A formed along the inner diameter portion of the stationary component 26 forms a piston area 26C. The flushing fluid applies fluid pressure or force to the piston area 26C in a direction opposite to the force applied by the biasing element 34. The piston area 26C can be sized and the flow rate and pressure of the flushing fluid can be selected such that the flushing fluid applies an opening force, indicated by arrows 92, that is greater than the combined closing force applied by the springs 34 and the process fluid. As such, the sealing surfaces 24A, 26A are forced apart into an open position and the flushing fluid passes along and through the seal face and into the stationary equipment 14. One or more of the sealing surfaces 24A, 26A are configured to be deliberately under-balanced, such that the pressure applied by the flushing fluid overcomes the closing force applied by the process fluid and the springs 34. The active flush regulation system 20 can be configured to regulate the flow of the flushing fluid across the seal face, and the flow rate and pressure of the flushing fluid can also be controlled to help regulate the flow of the flushing fluid.

The active flush regulation system 20 can be used in a sealing environment with other types of seals, such as mechanical seals and sealing assemblies (e.g., mechanical packing), that utilize a flushing fluid to purge the seal face area and to prevent the process fluid from the stationary equipment, which can contain particulates, from affecting the seal device. The active flush regulation system 20 can also function as a pressure regulator by regulating the pressure within the fluid regulation system. According to one embodiment, the active flush regulation system 20 can take advantage of the relatively flat sealing surfaces of the rotary component 24 and the stationary component 26 to provide the ability to control the gap formed between the sealing surfaces 24A, 26A so as to control and minimize the flow rates of the flushing fluid across the seal face. The active flush regulation system 20 employs the rotary and stationary components 24, 26 to control and restrict the flushing fluid, as opposed to a separate mechanical device, such as a throat bushing, as employed in conventional systems. The active flush regulation system 20 can be used to lower consumption of flushing fluid, enhance seal reliability, and extend the life of the mechanical seal components as a result of constant and reliable exposure to externally pressurized lubrication. Further, the active flush regulation system 20 can employ split components that allows the installation of the components without having to disassemble the equipment.

The pressure differential formed in the active flush regulation system 20 is directly dependent on the number of biasing elements 34 that are employed in the system. The pressure differential can thus be adjusted at any desired level based on the type, size, and configuration of the seal and the number of biasing elements that are used. According to one embodiment, upwards of eight biasing elements can be employed. Further, the flow rate of the flushing fluid can also be adjusted to any desired level. According to the embodiments of the present invention, the flow rate of the flushing fluid employed in the fluid regulating system 10 can substantially decrease because of the utilization of the active flush regulation system 20 rather than using a throat bushing. The gap formed between the sealing surfaces of the rotary and stationary components can be controlled and varied so as to allow a selected flow rate of flushing fluid through the gap and across the seal face. By way of simple example, the flow rate of the flushing fluid can be decreased from gallons per minute when used with a conventional throat bushing to gallons per hour when used with the active flush regulation system 20 of the present invention. The active flush regulation system 20 thus results in substantial costs savings associated with removing the flushing fluid from the process fluid.

Figure 6:
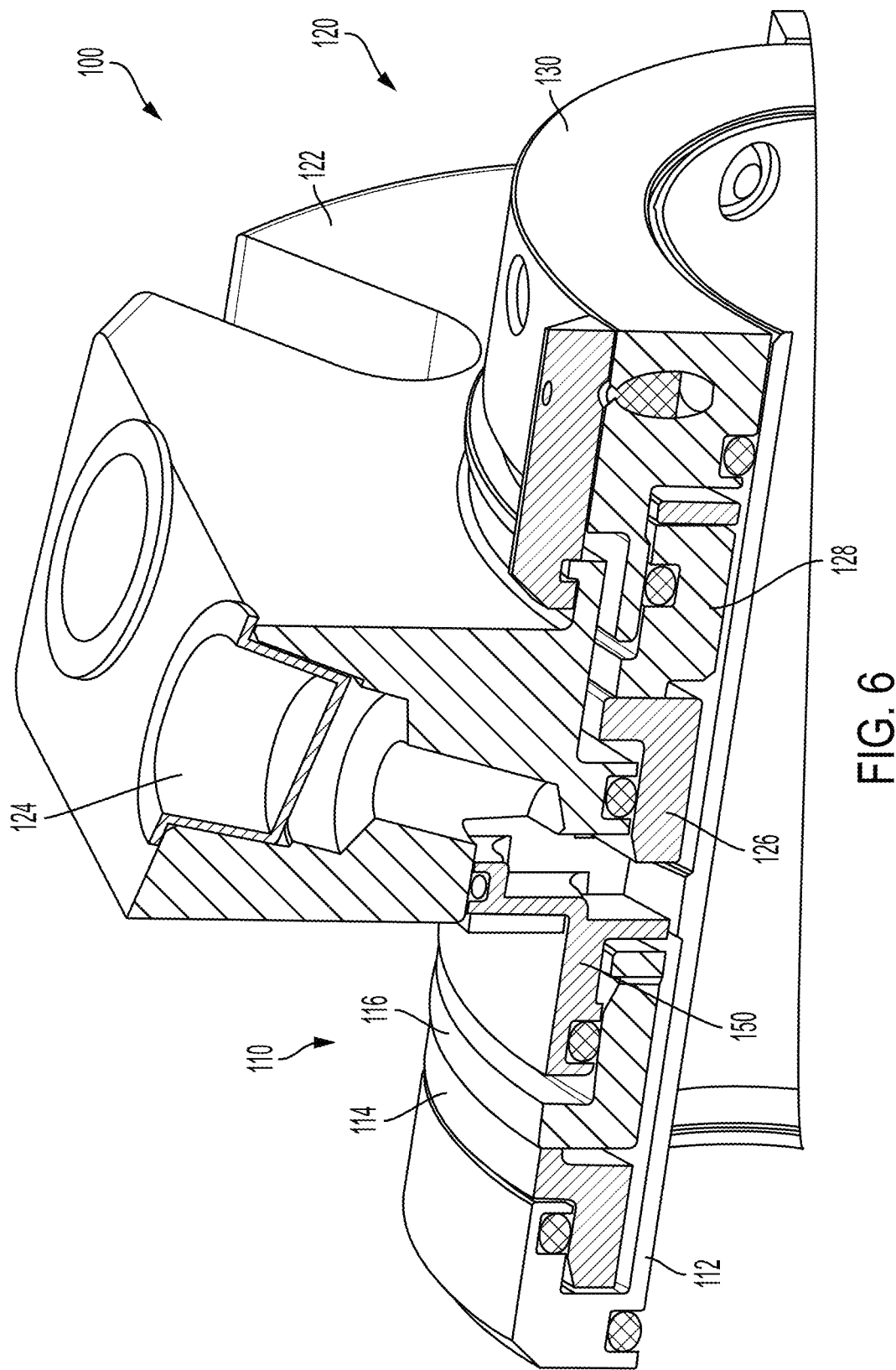
FIG. 6 is a partial cross-sectional perspective view of a second embodiment of a fluid regulating system employing an active flush regulation system used with a mechanical seal according to the teachings of the present invention.
Figure 7:
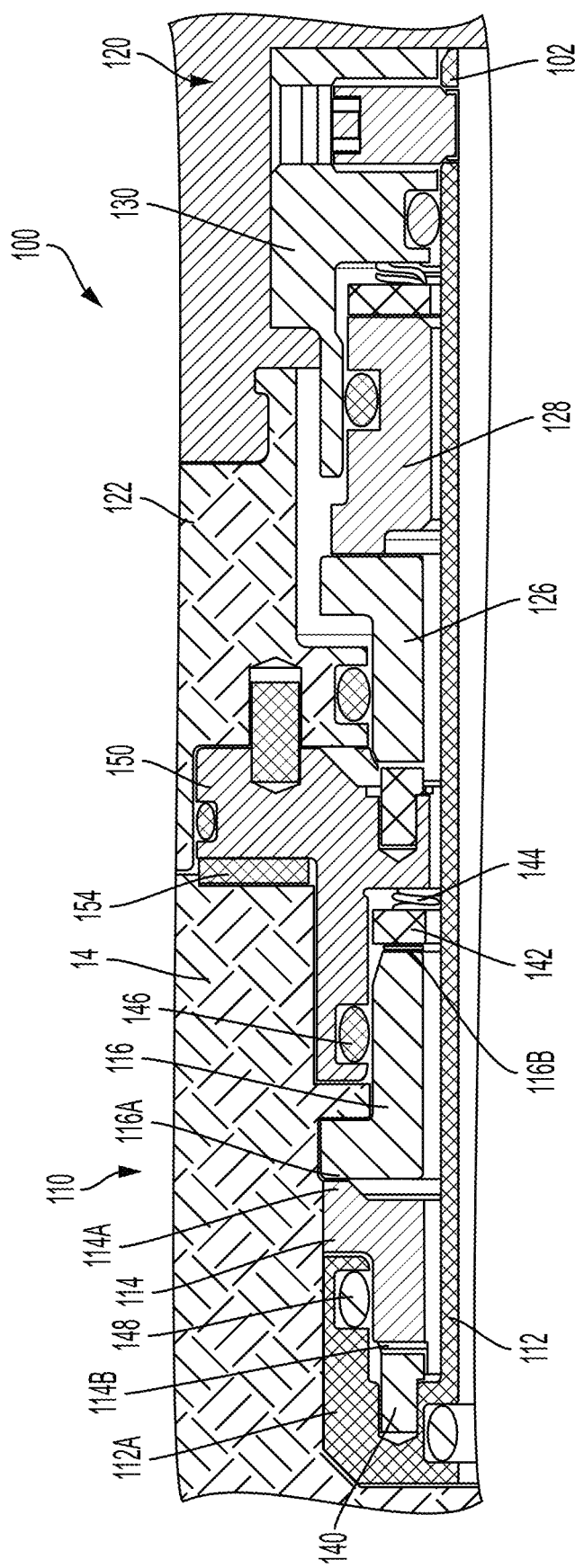
FIG. 7 is a cross-sectional view of the fluid regulating system of FIG. 6 according to the teachings of the present invention.
Figure 8:
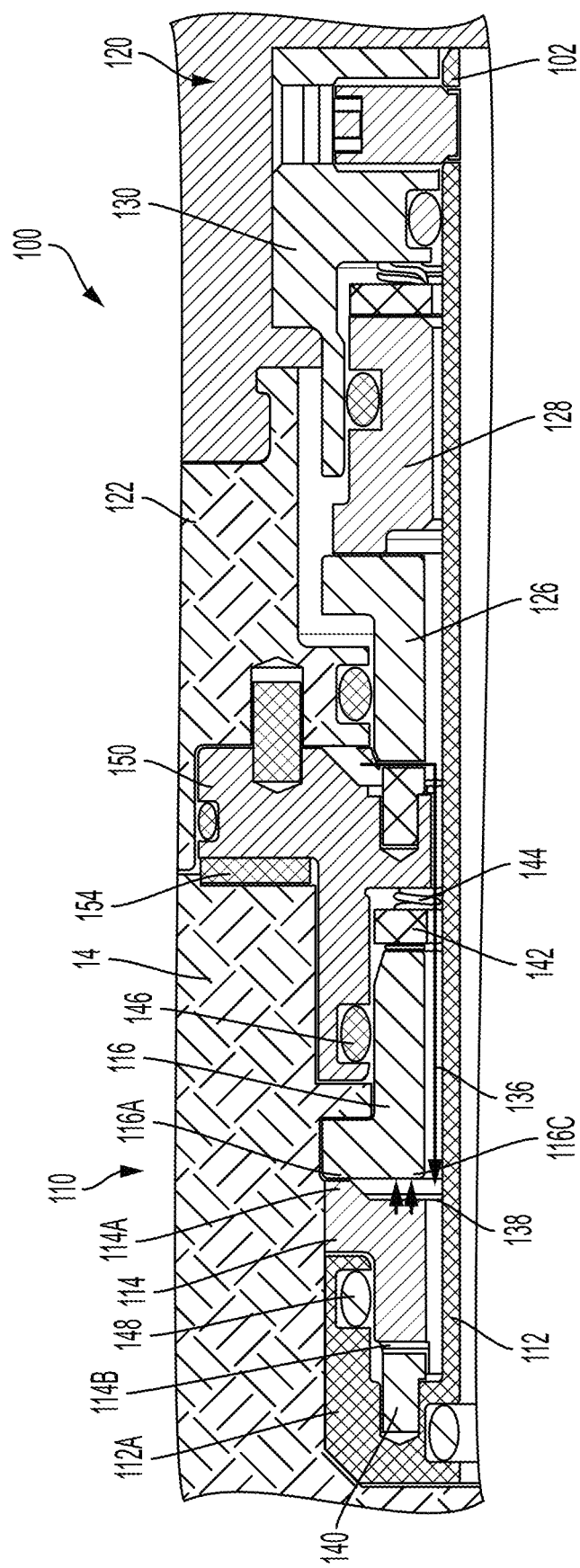
FIG. 8 is a cross-sectional view of the active flush regulation system of FIG. 6 showing the flow of the flushing fluid and pressure forces applied to a piston area of a stationary component according to the teachings of the present invention.

A second embodiment of the fluid regulating system of the present invention is shown for example in FIGS. 6-8. Like numbers indicate like parts throughout the various views and embodiments. The illustrated fluid regulating system 100 includes a mechanical seal 120 that is mounted about a movable (e.g., rotating) shaft 102. The illustrated mechanical seal 120 can include a gland element 122 that includes one or more fluid inlet ports 122 for introducing a flushing fluid into the system. The mechanical seal 120 can also include a rotary seal ring 126 and a stationary seal ring 128 forming a primary seal, and a lock ring 130 for locking or securing in place the seal rings. The mechanical seal 120 is typically mounted to the stationary equipment 14 to help seal a process fluid therein. The fluid regulating system 100 also includes an active flush regulation system 110 for regulating the flow rate of a flushing fluid that is introduced thereto via the gland inlet port 122. The illustrated active flush regulation system 110 can include one or more housing elements, a rotary component 114, and a stationary component 116. According to the second illustrated embodiment of the present invention, multiple holder elements can be employed in the active flush regulating system 110. The holder element can include, for example, a sleeve component 112 that is mounted or seated about the shaft 102 and is configured to hold and position the active flush regulation system 110 and the mechanical seal 120. The sleeve component 112 is configured to move with the shaft 102. As such, if the shaft 102 rotates, then the sleeve component 112 rotates as well. The illustrated sleeve component 112 can include an axial inboard flange portion 112A that is sized and configured for holding the rotary component 114. The rotary component 114 can be coupled to the flange portion 112A by way of any suitable mechanical connection, such as a pin 140. The mechanical connection between the rotary component 114 and the sleeve component 112 allows the rotary component 114 to rotate with the shaft 102.

The illustrated active flush regulation system 110 also includes an optional spacer element 142 positioned adjacent to the stationary component 116 and a biasing member 144, such as a spring. The system 100 can also include a second holder component 150. The holder component 150 can be coupled to the stationary equipment 14 or the gland 122 so as to remain stationary. The holder component 150 serves to radially position and house the rotary component 114 and the stationary component 116. A sealing element, such as a gasket 154, forms a fluid seal between the holder component 150 and a top or external surface of the stationary equipment 14. The biasing member 144 can be mounted or positioned between an inner radial surface of the holder component 150 and the spacer element 142. The holder component 150 also has a groove formed along an axially extending inner surface that mounts a sealing element 146, such as an O-ring. The sealing element 140 contacts an outer surface of the stationary component 116 to form a fluid seal between the holder component 150 and the outer surface of the stationary component 116. The stationary component 116 has a sealing surface 116A and an opposed top surface 116B. The rotary component 114 is positioned axially inwardly (e.g., inboard) of the stationary component 116 and has a sealing surface 114A and an opposed bottom surface 114B. The flange component 112A of the sleeve component 112 has an axially extending inner surface having a groove formed therein for seating a sealing element 148, such as an O-ring. The sealing element 148 contacts an outer surface of the rotary component 114 to form a fluid seal between the flange component 112A and the outer surface of the rotary component 114. In the illustrated embodiment, the contact area of the sealing surface 114A of the rotary component 114 is smaller than the planar sealing surface 116A of the stationary component. Specifically, the sealing surface 114A of the rotary component includes a sealing contact portion and a stepped planar surface that does not contact the opposed sealing surface 116A. The overlap of the confronting non-contacting portions of the sealing surfaces forms a piston area, identified as piston area 116C. The sealing surface 114A of the rotary component 114 is thus undersized relative to the sealing surface 116A of the stationary component to form an under-balanced seal face.

In operation, as shown in FIG. 8, the biasing element 144 forces the sealing surfaces 114A, 116A of the stationary and rotary components together to form a fluid seal. The sealing surfaces 114A, 116A contact each other when the pressure of the flushing fluid is insufficient to overcome the combined biasing force or pressure applied by the biasing member 34 and the process fluid surrounding the components 114, 116. As such, the sealing surfaces can be disposed in a closed position where at least of the sealing surfaces 114A, 116A contact each other to form a fluid seal. When a flushing fluid is introduced into the system, such as through the inlet port 124 formed in the gland 122, the flushing fluid flows along the path indicated by the arrows 136. The flushing fluid can be used to flush or clean the seal area and ensure proper lubrication and cooling while preventing the buildup of contaminants therein. The primary function of the flushing fluid includes lubrication, cooling, and contaminant removal by flushing away particles, debris, and other contaminants that could damage the seal or affect seal performance. The type of flushing fluid that can be employed in the fluid regulation system 100 depends on the application and the specific requirements of the system and mechanical seal, and can include for example water, oil, process fluid, and specialty fluids such as glycol-water mixtures, synthetic lubricants, chemical inhibitors, and the like. The flushing fluid applies a force on the rotary component 114 and more specifically on the sealing surface 116A of the stationary component 116. The area of the sealing face where the rotary component 114 does not contact the sealing surface 116A of the stationary component 114 forms the piston area 116C. The piston area 116C can be sized such that the flushing fluid applies an opening force to the sealing surface 116A of the stationary component 116, indicated by arrows 138, that is in a direction opposite to the closing force applied by the biasing member 144 and the process fluid acting upon the stationary component 116. When the opening force applied by the flushing fluid is greater than the closing force applied by the biasing member 144 and the process fluid, then the sealing surfaces separate and are moved into an open position. In the open position, the sealing surfaces 114A, 116A are forced apart and the flushing fluid passes along and through the seal face formed therebetween and into the stationary equipment 14. The sealing surfaces 114A, 116A are configured to be deliberately under-balanced, such that the flushing fluid applies an opening force along the inner diameter portion of the sealing surface and is sufficient to overcome the closing force applied by the process fluid and the biasing member 144.

The active flush regulation system 110 can be used in a sealing environment that utilizes flushing fluid to purge the seal area and prevent the process fluid from the stationary equipment 14 that can contain particulates from affecting the sealing devices. The active flush regulation system 110 can also function as a pressure regulator by regulating the pressure within the fluid regulation system 100. The pressure regulation aspect occurs since the flow rate of the flushing fluid and the amount of opening force applied by the flushing fluid dictates the size of the gap formed between the sealing surfaces 114A, 116A. As such, the active flush regulation system 110 can serve to regulate the gap size and hence the flow rate of the flushing fluid passing along the seal face. According to one embodiment, the active flush regulation system 110 can take advantage of the relatively flat sealing surfaces of the stationary component 116 and the piston area 116C to provide the ability to control the size of the gap formed between the sealing surfaces 114A, 116A so as to control, restrict, and minimize the flow rates of the flushing fluid between the stationary and rotary components. Further, the active flush regulation system 110 can optionally employ split components that allows the installation of the components without having to disassemble the equipment. The pressure differential in the active flush regulation system 110 is also directly dependent on the number of springs 144 used in the system 100. The pressure differential can thus be adjusted at any desired level based on the type, size, and configuration of the seal. Further, the flow rate of the flushing fluid can also be adjusted to any desired level.

Figure 9:
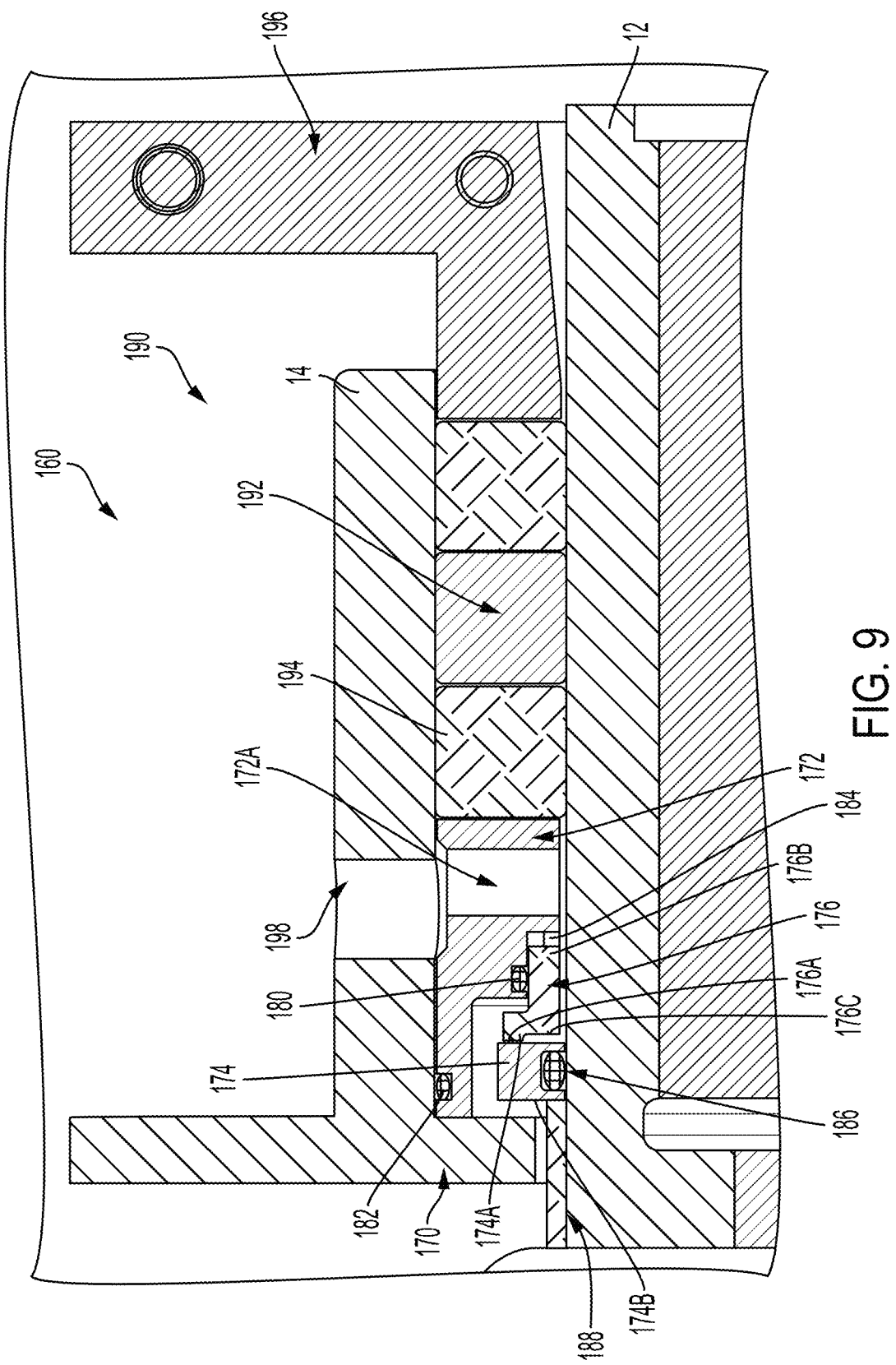
FIG. 9 is a partial cross-sectional view of a third embodiment of a fluid regulating system employing an active flush regulation system used with a sealing assembly according to the teachings of the present invention.

A third embodiment of the fluid regulation system of the present invention employing an active flush regulation system is shown for example in FIG. 9. Like numbers indicate like parts throughout the various views and embodiments. The operation of the active flush regulation system is similar to the operation of the active flush regulation systems of the previous embodiments. The illustrated fluid regulating system 160 includes an active flush regulation system 170 that can be mounted on or in connection with the stationary equipment 14. The stationary equipment 14 can include an equipment housing that corresponds, for example, to a pump or a valve. The stationary equipment 14 houses a movable (e.g., rotating) shaft 12 that extends or protrudes outwardly therefrom. The stationary equipment 14 can have a suitable chamber or stuffing box formed therein adjacent the shaft 12 that mounts the active flush regulation system 170 as well as a sealing assembly.

The illustrated fluid regulation system 160 can also employ a sealing assembly 190 for providing a seal for the process fluid housed within the stationary equipment, such as a packing gland. As used herein, the sealing assembly is a type of mechanical seal. The sealing assembly 190 can include a packing assembly 192 that can include a series of packing elements 194. The packing elements 194 may be in the form of a braided packing material and is commonly square or round when viewed in cross section, although the packing elements can be provided in a variety of cross-sectional shapes. The packing elements 194 can be cut to an appropriate size and wrapped around the shaft 12 to form a ring. Multiple rings of packing material forming individually stacked packing elements 194 can be provided along the length of the shaft 12 in the stuffing box in order to provide a seal around the shaft. Typically, in order to form the packing elements 194, one or more packing materials are braided together in a braid pattern, such as a square pattern or a corner-reinforced pattern. The braiding patterns are realized by moving two or more materials along a series of material paths in an x-y plane, which builds up a braided structure that increases in size in a z-plane.

The illustrated stationary equipment 14 can be in form of a packing gland that can be used to secure the packing elements 194 inside the stuffing box of the packing gland and to compress the packing elements 194 around the shaft 12. The packing gland 14 can have one or more fluid supply or inlet ports 198 formed therein for suppling a fluid, such as a flushing fluid, into the system. The fluid regulating system 160 also includes a follower element 196 for applying an axially compressive force to the packing assembly 190. The follower element 196 is axially movable and is sized and configured for applying an axial load or force to the packing elements 194. Specifically, the follower element 196 is designed to be axially movable and can be pressed or tightened downwards along the axis of the shaft or stem to apply axial pressure to the packing assembly 192. The axial movement of the follower element 196 is usually achieved through threaded bolts or screws that pass through the gland flange and engage with the follower element 196. As the bolts or screws are tightened, the follower element 196 is forced against the packing assembly 192. The compression of the packing elements 194 increases the density thereof and ensures that the packing elements conform to the surface of the shaft to create a tight seal. The applied axial pressure from the follower element 196 ensures that the packing elements 194 remain under constant compression, which helps maintain the effectiveness of the seal. As the packing material of the packing elements wears or deforms over time, the follower element 196 can be further tightened to maintain the necessary compression and sealing performance.

The illustrated active flush regulation system 170 can include a rotary component 174, a stationary component 176, and a holder component 172 that can be coupled to the stationary equipment 14 so as to remain stationary. The holder element can be in the form of a modified lantern ring that forms a housing. The holder component 172 can be positioned within the stuffing box adjacent to the packing assembly 192 so as to position the packing elements 194 and to provide a pathway for the introduction of the flushing fluid. The holder component 172 also serves to position the stationary and rotary components. The holder component 172 can have a fluid port 172A formed therein that is fluidly coupled or in fluid communication with the inlet port 194. The inlet port 194 and the fluid port 172A in combination form a fluid passageway that enables a flushing fluid to be introduced from an external source to the active flush regulation system 170. The holder component 172 also serves to position both radially and axially the rotary component 174 and the stationary component 176. The stationary component 176 is coupled to the holder component 172 via any suitable connection element. A sealing element 180 can be seated within a corresponding groove formed in an axially extending inner surface of the holder element 172 to form a fluid seal between the holder component 172 and an external or outer surface of the stationary component 176. Further, the holder component 172 can have a groove formed in an outer surface to seat a sealing element 182. The sealing element 182 can form a fluid seal between the outer surface of the holder component 172 and an inner surface of the stuffing box of the stationary equipment 14. The active flush regulation system 170 can also include a biasing member 184, such as a spring, that is mounted between a top surface 176B of the stationary component 176 and a radially inwardly extending inner surface of the holder component 172. The illustrated stationary component 176 has a stator sealing surface 176A and the opposed top surface 176B. The rotary component 174 is positioned axially inwardly (e.g., inboard) of the stationary component 176 and has a rotor sealing surface 174A and an opposed bottom surface 174B. The rotor sealing surface 174A can be a single relatively flat, planar surface or can include multiple stepped surfaces. According to one embodiment, the scaling surface 174A includes a single planar surface. The planar portion of the stator sealing surface 176A of the stationary component 176 that contacts the planar sealing surface 174A of the rotary component 174 to form the fluid seal is smaller than the planar sealing surface of the rotary component 174. The sealing surface 176A of the stationary component 176 is thus undersized relative to the sealing surface of the rotary element to form an under-balanced seal face. In one embodiment, the inner surface of the rotary component 174 has an opening formed therein for seating a sealing element 186, such as an O-ring. The sealing element 186 forms a fluid seal between the rotary component 174 and the sleeve component 12. The active flush regulation system 170 can also include an optional spacer element 188 for spacing the holder component 172 and the stationary equipment 14 from the shaft 12.

In operation, as shown in FIG. 9, the biasing member 184 forces the sealing surfaces 174A, 176A together to form a fluid seal. The sealing surfaces contact each other when the pressure of the flushing fluid is insufficient to overcome the biasing force or pressure applied by the biasing member 184 and the process fluid surrounding the components 174, 176. As such, the forces applied by the biasing member 184 and the process fluid place the sealing surfaces in a closed position where the sealing surfaces contact each other. When a flushing fluid is introduced into the system through the inlet port 198 and the fluid port 172A, the flushing fluid flows along the shaft 12 to the seal face formed by the stationary and rotary components at a selected flow rate. The flow rate of the flushing fluid refers to the volume of fluid that passes through the active flush regulation system 110 per unit of time. The flushing fluid can be used to flush or clean the seal area and ensure proper lubrication and cooling while preventing the buildup of contaminants therein. The primary functions of the flushing fluid include lubrication, cooling, and contaminant removal by flushing away particles, debris, and other contaminants that could damage the seal or affect seal performance. Since the rotary and stationary components are configured to be under-balanced, the flushing fluid flows to the inner diameter of the sealing surfaces 174A, 176A and applies a force thereto. Specifically, the stepped portion of the stator sealing surface 176A formed along the inner diameter portion of the stationary component 176 forms a piston area 176C. The flushing fluid applies a fluid force on the sealing surface 174A of the rotary component 174 and on the piston area 176C of the stationary component 176 in a direction opposite to the closing force generated by the biasing member 184. The piston area 176C can be sized and the flow rate and pressure of the flushing fluid can be selected such that the flushing fluid applies an opening force thereon that is greater than the combined force applied by the biasing member 184 and the process fluid. As such, the sealing surfaces 174A, 176A are forced apart into an open position and the flushing fluid passes along and through the seal face and into the stationary equipment 14. Thus, one or more of the sealing surfaces 174A, 176A are configured to be deliberately under-balanced, such that the pressure applied by the flushing fluid overcomes the closing force applied by the process fluid and the biasing member 184. The active flush regulation system 170 can be configured to regulate the flow of the flushing fluid across the seal face, and the flow rate and pressure of the flushing fluid can also be controlled to help regulate the flow of the flushing fluid.

The active flush regulation system 170 can be used in a sealing environment (e.g. equipment utilizing a mechanical seal or mechanical packing) that utilizes flush fluid to purge the seal area/cavity and prevent the process fluid from the stationary equipment that can contain particles to affect the seal device. The active flush regulation system 170 can also function as a pressure regulator by regulating the pressure within the fluid regulation system. According to one embodiment, the active flush regulation system 170 can take advantage of the relatively flat sealing surfaces of the rotary component 174 and the stationary component 176 to provide the ability to control the gap between the sealing surfaces so as to control and minimize the flow rates of the flushing fluid. The active flush regulation system 170 employs the rotary and stationary components to control and restrict the flushing fluid, as opposed to a throat bushing as employed in conventional devices. The active flush regulation system 170 can be used to lower consumption of the flushing fluid, enhance seal reliability, and extend the life of the mechanical seal components as a result of constant and reliable exposure to externally pressurized lubrication. Further, the active flush regulation system 170 can employ split components that allows the installation of the components without having to disassemble the equipment. The pressure differential in the active flush regulation system 170 is directly dependent on the number of springs 184 used in the system. The pressure differential can thus be adjusted at any desired level based on the type, size, and configuration of the seal. Further, the flow rate of the flushing fluid can also be adjusted to any desired level. According to the embodiments of the present invention, the flow rate of the flushing fluid employed in the fluid regulating system 160 can substantially decrease because of the utilization of the active flush regulation system 170 rather than using a throat bushing.

Figure 10:
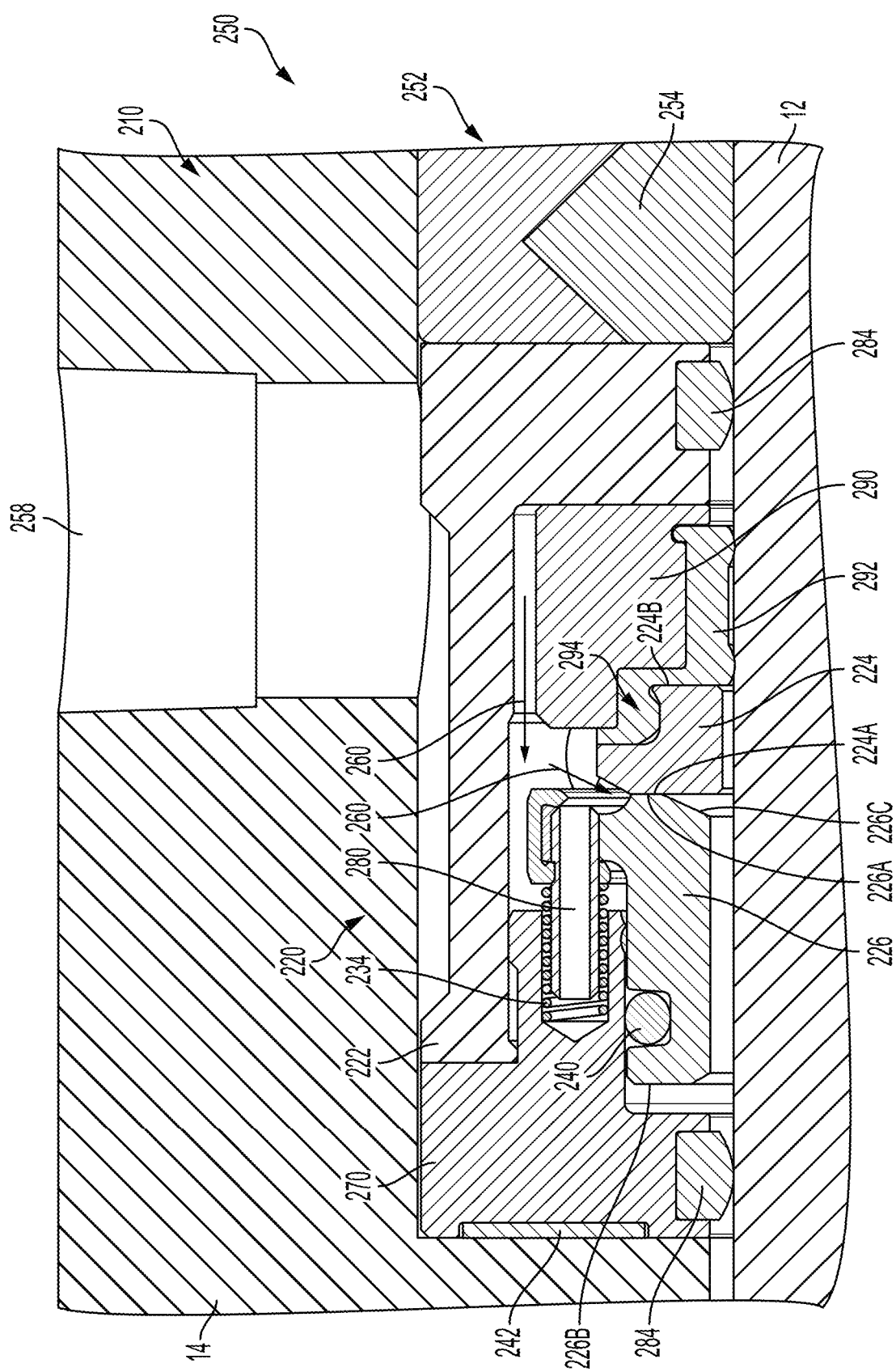
FIG. 10 is a partial cross-sectional view of a fourth embodiment of a fluid regulating system employing a split active flush regulation system used with a sealing assembly according to the teachings of the present invention.
Figure 11:
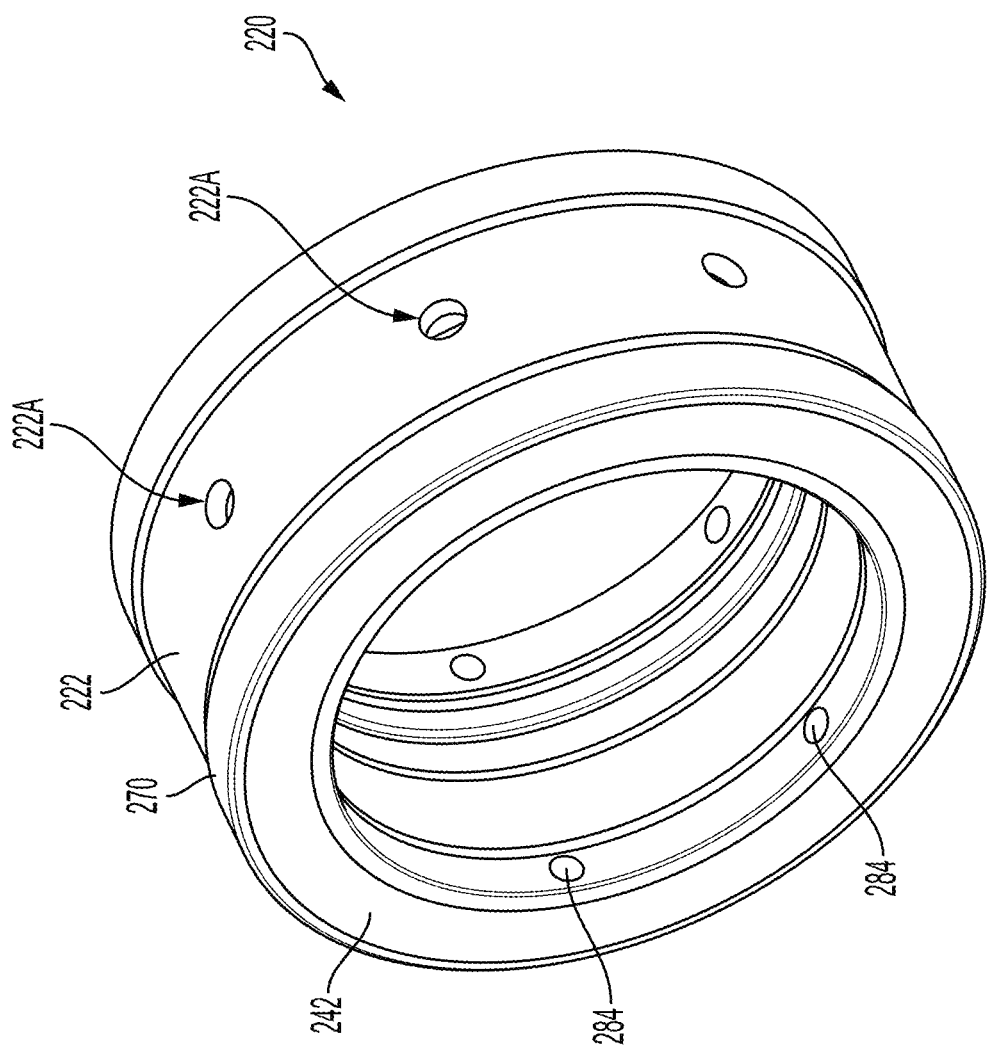
FIG. 11 is a perspective view of the active flush regulation system of FIG. 10 according to the teachings of the present invention.

A fourth embodiment of the fluid regulation system of the present invention employing an active flush regulation system is shown for example in FIGS. 10 and 11. The active flush regulation systems of the previous embodiments can be solid or split in design. In the current embodiment, the active flush regulation system is of a split design. Like numbers indicate like parts throughout the various views and embodiments. The operation of the active flush regulation system is similar to the operation of the active flush regulation systems of the previous embodiments. The illustrated fluid regulating system 210 includes an active flush regulation system 220 that can be mounted on or in connection with the stationary equipment 14. The stationary equipment 14 can include an equipment housing that corresponds, for example, to a pump or a valve. The stationary equipment 14 houses a movable (e.g., rotating) shaft 12 that extends or protrudes outwardly therefrom. The stationary equipment 14 can have a suitable chamber or stuffing box formed therein adjacent the shaft 12 that mounts the active flush regulation system 220.

The illustrated fluid regulation system 210 can also employ a sealing assembly 250 for providing a seal for the process fluid housed within the stationary equipment 14, such as a packing gland. As used herein, the sealing assembly is a type of mechanical seal. The sealing assembly 250 can include a packing assembly 252 that can include a series of packing elements 254. The packing elements 254 may be in the form of a braided packing material and is commonly square or round when viewed in cross section, although the packing elements can be provided in a variety of cross-sectional shapes. The packing elements 254 can be cut to an appropriate size and wrapped around the shaft 12 to form a ring. Multiple rings of packing material forming individually stacked packing elements 254 can be provided along the length of the shaft 12 in the stuffing box in order to provide a seal around the shaft. Typically, in order to form the packing elements 254, one or more packing materials are braided together in a braid pattern, such as a square pattern or a corner-reinforced pattern. The braiding patterns are realized by moving two or more materials along a series of material paths in an x-y plane, which builds up a braided structure that increases in size in a z-plane.

The illustrated stationary equipment 14 can be in form of a packing gland or other housing that can be used to secure the packing elements 254 inside the stuffing box of the packing gland and to compress the packing elements 254 around the shaft 12. The packing gland 14 can have one or more fluid supply or inlet ports 258 formed therein for suppling a fluid, such as a flushing fluid, into the system.

The illustrated active flush regulation system 220 can include a rotary component 224, a stationary component 226, and a holder component 222 that can be coupled to the stationary equipment 14 so as to remain stationary. The holder component 222 can be in the form of a modified thrust bearing that forms a housing. The holder component 222 can be positioned within the stuffing box adjacent to the packing assembly 252 so as to position the packing elements 254 and to provide a pathway for the introduction of the flushing fluid. The holder component 222 also serves to position the stationary and rotary components. The holder component 222 can have a fluid port 222A formed therein that is fluidly coupled or in fluid communication with the inlet port 258. The inlet port 258 and the fluid port 222A in combination form a fluid passageway that enables a flushing fluid to be introduced from an external source to the active flush regulation system 220. The holder component 222 also serves to position both radially and axially the rotary component 224 and the stationary component 226.

The illustrated active flush regulation system 220 further includes a second housing component 270 seated within the stuffing box and is coupled thereto so as to remain stationary. The second housing component 270 has an axially positioned top surface that has a chamber formed therein for seating a connection component 280, such as a pin. A biasing member 234 can be disposed about the pin 280 and seated within the chamber. The second housing component 270 can be coupled to the stationary component 226 via the connection component 280. The second housing component 270 can have a series of openings formed along an inner surface adjacent the shaft 12 to seat a centering element 284. The centering element helps center the shaft 12 within the stuffing box and to help center the active flush regulation system 220 relative to the shaft 12.

The active flush regulation system 220 also includes a spacer element 290 for axially positioning the rotary component 224 and the stationary component 226 and for spacing the rotary component from the first holder component 222. The active flush regulation system 220 employs a sealing element 292 that is positioned between the spacer element 290 and the rotary component 224 and is configured to form a seal between the sealing element 292 and the shaft 12 and between the spacer element 290 and the rotary component 224. The radially innermost inner surface of the holder component 222 has an opening or chamber formed therein for seating a centering element 284. The holder component 222, the spacer element 290 and the sealing element 292 are coupled to the shaft 12 and as such rotates therewith. The rotary component 224 is coupled to the sealing element 292 via a suitable connection mechanism 294 and as such also rotates with the shaft.

The illustrated stationary component 226 is coupled to the second holder component 270 via the connection element 280. A sealing element 240 can be seated within a corresponding groove formed in an axially extending outer surface of the stationary component 226 to form a fluid seal between the stationary component 226 and an inner surface of the holder component 270. Further, the holder component 270 can have a groove formed in an end surface to seat a sealing element 242, such as a gasket. The sealing element 242 can form a fluid seal between the holder component 270 and an inner surface of the stuffing box of the stationary equipment 14. The illustrated stationary component 226 has a stator sealing surface 226A and an opposed bottom surface 226B. The rotary component 224 is positioned axially outwardly (e.g., outboard) of the stationary component 226 and has a rotor sealing surface 224A and an opposed top surface 224B. The rotor sealing surface 224A can be a single relatively flat, planar surface or can include multiple stepped surfaces. According to one embodiment, the sealing surface 224A includes a single planar surface. The planar sealing portion of the stator sealing surface 226A of the stationary component 226 contacts the planar sealing surface 224A of the rotary component 224 that forms the fluid seal is smaller than the planar sealing surface 224A of the rotary component 224. The sealing surface 226A of the stationary component 176 is stepped and the sealing portion of the sealing surface 226A is undersized relative to the sealing surface of the rotary element to form an under-balanced seal face.

In operation, as shown in FIG. 10, the biasing member 234 forces the sealing surfaces 224A, 226A together to form a fluid seal. The sealing surfaces contact each other when the pressure of the flushing fluid is insufficient to overcome the biasing force or pressure applied by the biasing member 234 and the process fluid surrounding the components 224, 226. As such, the forces applied by the biasing member 234 and the process fluid place the sealing surfaces in a closed position where the sealing surfaces contact each other. When a flushing fluid is introduced into the system through the inlet port 258 and the fluid port 222A, the flushing fluid flows along the outside or outer diameter of the rotary component 224 and the stationary component 226 to the seal face formed therebetween at a selected flow rate, as indicated by arrows 260. The flow rate of the flushing fluid refers to the volume of fluid that passes through the active flush regulation system 220 per unit of time. The flushing fluid can be used to flush or clean the seal area and ensure proper lubrication and cooling while preventing the buildup of contaminants therein. The flushing fluid flows to the seal face and pushes against the sealing surfaces 226A and 224A, initially separating the sealing surfaces. The flushing fluid then flows along the seal face to the stepped inner diameter portion of the sealing surface 226A and applies a further force in a direction opposite to the biasing force applied by the biasing member 234. Since the rotary and stationary components 224, 226 are configured to be under-balanced, the flushing fluid applies a force to move the stationary component 226 axially inwardly into an open position. Specifically, the stepped portion of the stator sealing surface 226A formed along the inner diameter portion of the stationary component 226 forms a piston area 226C. The flushing fluid applies a fluid force on the piston area 226C of the stationary component 176 in a direction opposite to the closing force generated by the biasing member 234. The piston area 176C can be sized and the flow rate and pressure of the flushing fluid can be selected such that the flushing fluid applies an opening force thereon that is greater than the combined force applied by the biasing member 234 and the process fluid. As such, the sealing surfaces 224A, 226A are forced apart into an open position and the flushing fluid passes along and through the seal face, along the inner surface of the stationary component 226 and into the stationary equipment 14. Thus, one or more of the sealing surfaces 224A, 226A are configured to be deliberately under-balanced, such that the pressure applied by the flushing fluid overcomes the closing force applied by the process fluid and the biasing member 234. The active flush regulation system 220 can be configured to regulate the flow of the flushing fluid across the seal face, and the flow rate and pressure of the flushing fluid can also be controlled to help regulate the flow of the flushing fluid.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A fluid regulating system, comprising
   a stationary equipment configured for housing a process fluid and a rotating shaft,
   a mechanical seal coupled to the stationary equipment and disposed about the rotating shaft for helping seal the process fluid in the stationary equipment, and
   an active flush regulation system for regulating a flow of a flushing fluid introduced thereto, the active flush regulating system including
      a rotary component coupled to the rotating shaft and rotating therewith, the rotary component having a rotor sealing surface,
      a stationary component coupled to the stationary equipment and having a stator sealing surface that confronts and is disposed adjacent to the rotor sealing surface,
      one or more biasing elements for applying a biasing force to the stationary component in a first direction for biasing together the rotor sealing surface and the stator sealing surface, and
      a holder component coupled to one of the rotary component and the stationary component for holding one or more of the stationary component and the rotary component,
   wherein one or more of the rotor sealing surface and the stator sealing surface are configured to form an under-balanced seal face, and wherein in a first closed position the rotor sealing surface and the stationary sealing surface contact to each other to form a seal at the seal face,
   wherein when the flushing fluid is introduced to the seal face the flushing fluid acts upon a piston area formed on one or more of the stator sealing surface and the rotor sealing surface, wherein the flushing fluid applies a force to the piston area in a second direction opposite the first direction of the biasing force, and
   wherein when the force applied by the flushing fluid is greater than the biasing force and a force applied by the process fluid, the flushing fluid moves at least the stator sealing surface in an open position where the rotor sealing surface and the stator sealing surface are separated from each other to form a gap to allow the flushing fluid to pass therealong.

2. The fluid regulating system of claim 1, wherein the mechanical seal comprises a rotary seal ring, a stationary seal ring, and a lock ring, wherein the rotary seal ring is coupled to the shaft to rotate therewith, and wherein the rotary seal ring and the stationary seal ring form a sealing interface.

3. The fluid regulating system of claim 1, wherein the mechanical seal comprises a sealing assembly.

4. The fluid regulating system of claim 3, wherein the sealing assembly comprises a packing assembly having a plurality of packing elements, wherein each of the packing elements is formed from a packing material.

5. The fluid regulating system of claim 1, wherein the gap formed between the rotor sealing surface and the stator sealing surface regulates the flow of flushing fluid passing along the seal face.

6. The fluid regulating system of claim 5, further comprising a sleeve component disposed about and rotatably coupled to the shaft and is configured for holding one or more of the rotary component and the stationary component.

7. The fluid regulating system of claim 5, wherein the rotary component has an inner axially extending surface having a groove formed therein for seating a sealing element.

8. The fluid regulating system of claim 5, wherein the holder component has a groove formed along an inner axially extending surface for seating a sealing element, wherein the sealing element is positioned to contact an outer axially extending surface of the stationary component.

9. The fluid regulating system of claim 8, further comprising a second holder element configured as a sleeve component that is coupled to the shaft and is rotatable therewith, wherein the sleeve component is configured to hold and to position the active flush regulation system.

10. The fluid regulating system of claim 5, wherein the holder element comprises a sleeve component that is disposed about the shaft and rotatably coupled thereto and is configured to hold and to position the active flush regulation system, and wherein the sleeve component includes a flange portion that is sized and configured for holding the rotary component.

11. The fluid regulating system of claim 5, wherein the piston area is formed on the stator sealing surface to form the under-balanced seal face.

12. An active flush regulation system for use with a mechanical seal that is coupled to stationary equipment for regulating a flow of a flushing fluid, wherein the stationary equipment is configured for housing a process fluid and a rotating shaft, comprising
   a rotary component configured to be coupled to the rotating shaft and rotating therewith, the rotary component having a rotor sealing surface,
   a stationary component configured to be coupled to the stationary equipment and having a stator sealing surface that confronts and is disposed adjacent to the rotor sealing surface,
   one or more biasing elements for applying a biasing force to the stationary component in a first direction for biasing together the rotor sealing surface and the stator sealing surface, and
   a holder component coupled to one of the rotary component and the stationary component for holding one or more of the stationary component and the rotary component,
   wherein one or more of the rotor sealing surface and the stator sealing surface are configured to form an under-balanced seal face, and wherein in a first closed position the rotor sealing surface and the stationary sealing surface contact to each other to form a seal at the seal face,
   wherein when the flushing fluid is introduced to the seal face the flushing fluid acts upon a piston area formed on one or more of the stator sealing surface and the rotor sealing surface, wherein the flushing fluid applies a force to the piston area in a second direction opposite the first direction of the biasing force, and
   wherein when the force applied by the flushing fluid is greater than the biasing force and a force applied by the process fluid, the flushing fluid moves at least the stator sealing surface in an open position where the rotor sealing surface and the stator sealing surface are separated from each other to form a gap to allow the flushing fluid to pass therealong.

13. The active flush regulation system of claim 12, wherein the gap formed between the rotor sealing surface and the stator sealing surface regulates the flow of flushing fluid passing through the seal face.

14. The active flush regulation system of claim 13, further comprising a sleeve component configured to be disposed about and rotatably coupled to the shaft and is configured for holding one or more of the rotary component and the stationary component.

15. The active flush regulation system of claim 13, wherein the rotary component has an inner axially extending surface having a groove formed therein for seating a sealing element.

16. The active flush regulation system of claim 13, wherein the holder component has a groove formed along an inner axially extending surface for seating a sealing element, and wherein the sealing element is positioned in use to contact an outer axially extending surface of the stationary component.

17. The active flush regulation system of claim 16, further comprising a second holder element configured as a sleeve component that is configured to be coupled to the shaft and is rotatable therewith, wherein the sleeve component is configured to hold and to position one or more of the stationary component and the rotary component.

18. The active flush regulation system of claim 12, wherein the holder element comprises a sleeve component that is configured to be disposed about the shaft and is rotatably coupled thereto, and is configured to hold and to position one or more of the stationary component and the rotary component, and wherein the sleeve component includes a flange portion that is sized and configured for holding the rotary component.

19. The active flush regulation system of claim 12, wherein the piston area is formed on the stator sealing surface to form the under-balanced seal face.

* * * * *